June 14, 1938.  H. L. ADAMS  2,120,477
DETACHABLE CABIN WITH PARACHUTE
Filed July 30, 1932  8 Sheets-Sheet 1
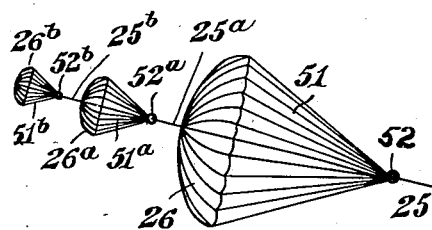
Fig.1.
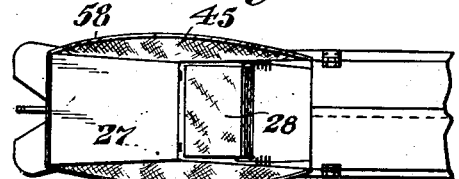
Fig.2.
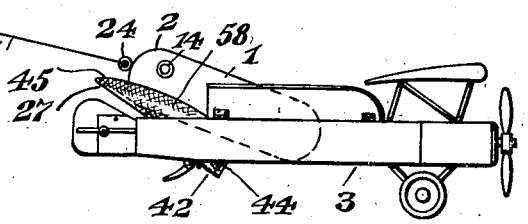
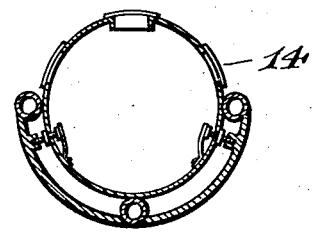
Fig.4.
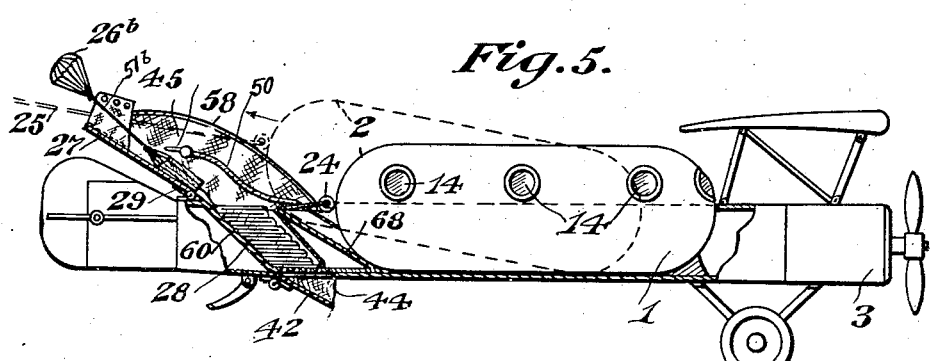
Fig.5.

June 14, 1938.　　　H. L. ADAMS　　　2,120,477
DETACHABLE CABIN WITH PARACHUTE
Filed July 30, 1932　　　8 Sheets-Sheet 2
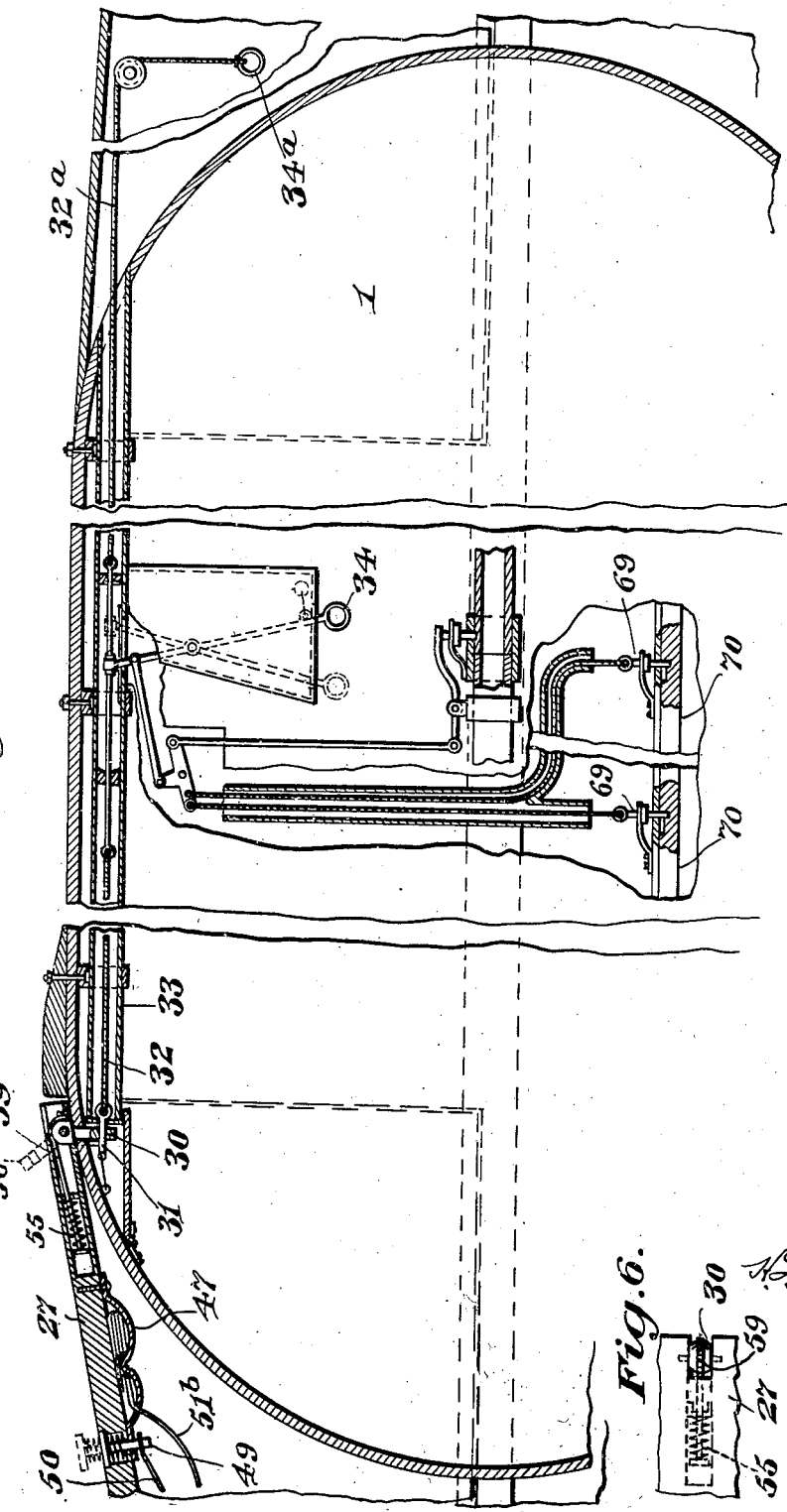
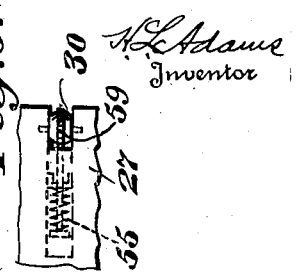
H. L. Adams
Inventor

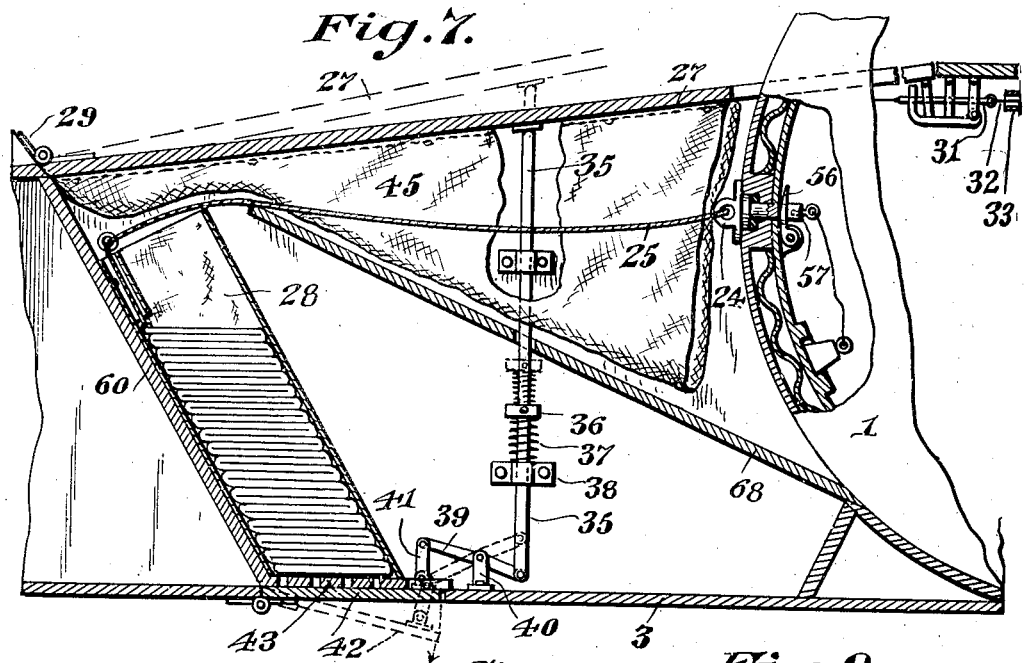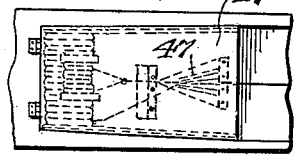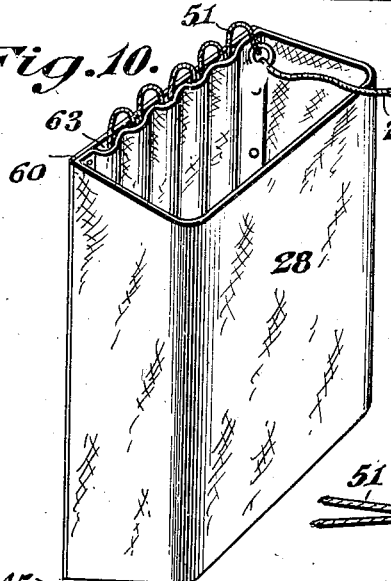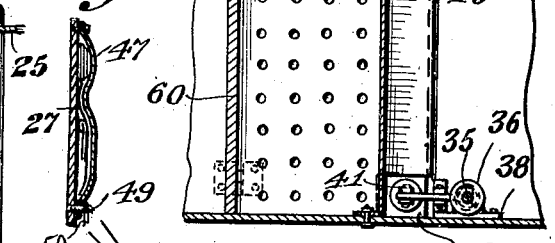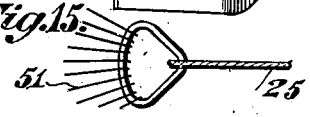

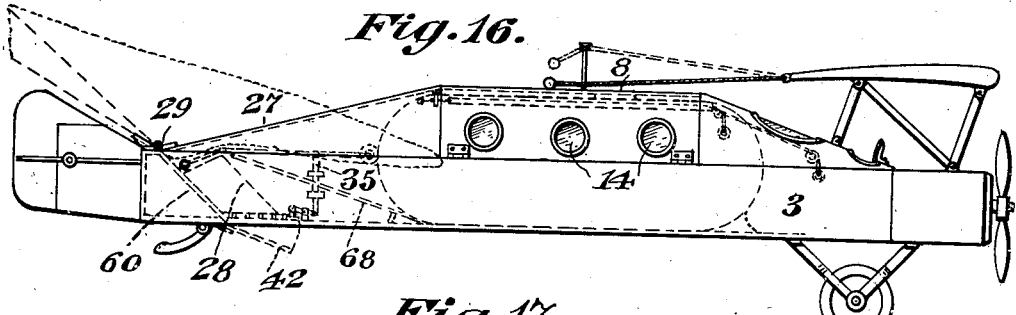
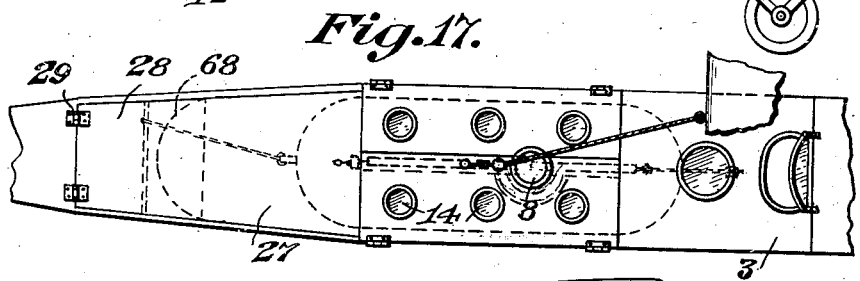
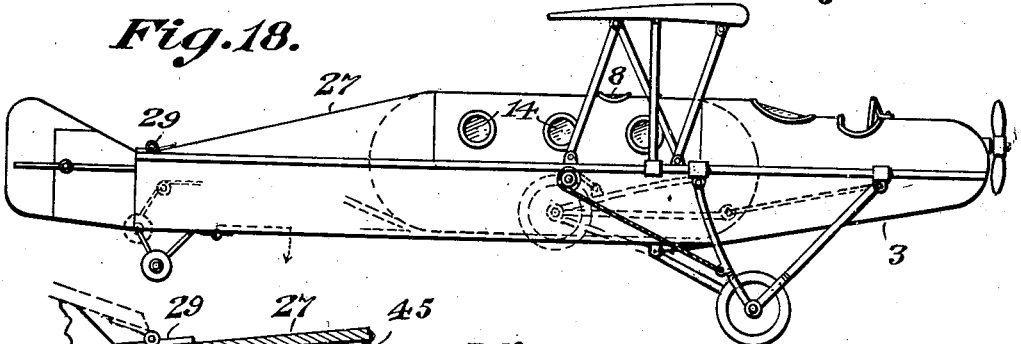
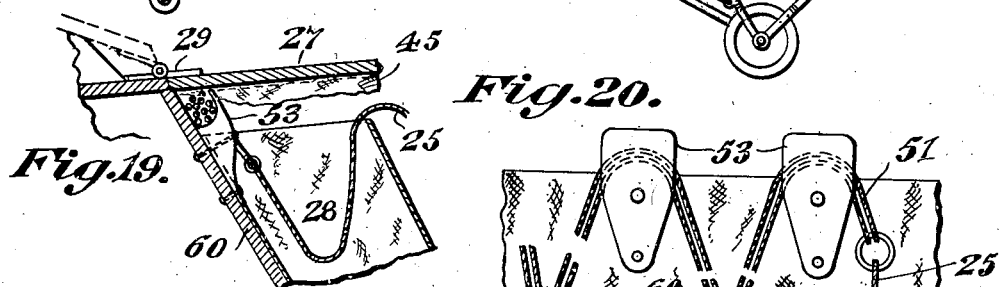
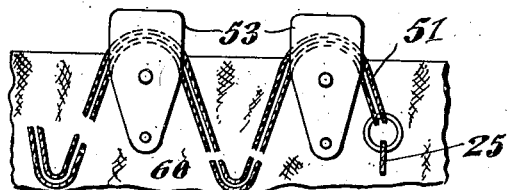
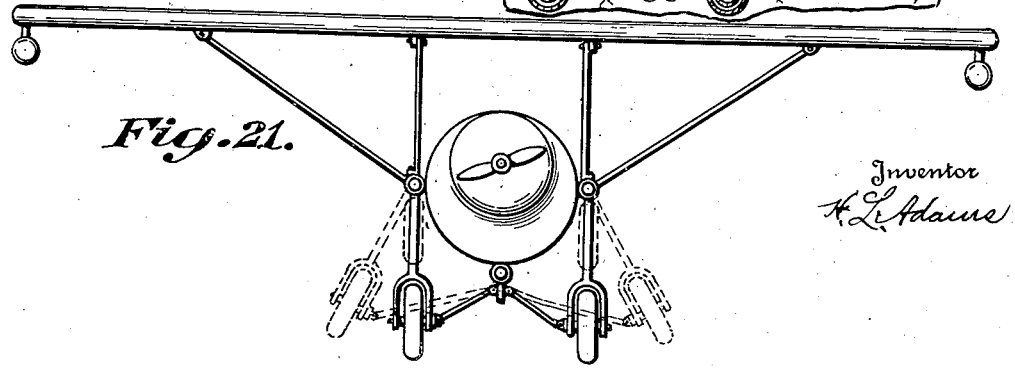

June 14, 1938. H. L. ADAMS 2,120,477
DETACHABLE CABIN WITH PARACHUTE
Filed July 30, 1932 8 Sheets-Sheet 5
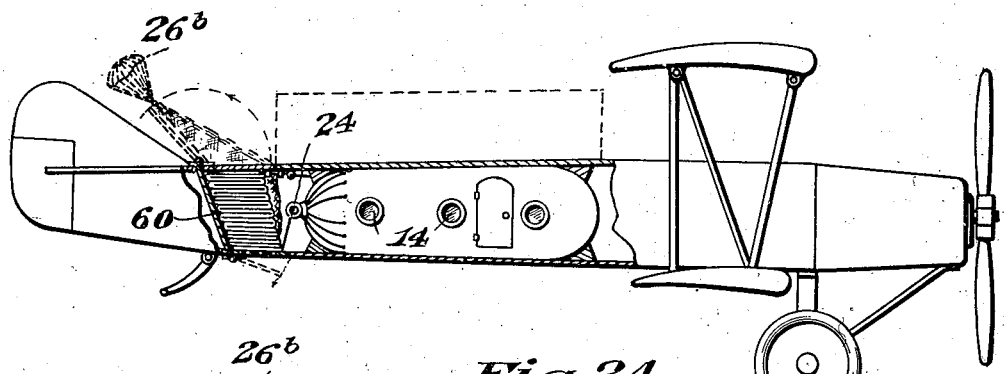
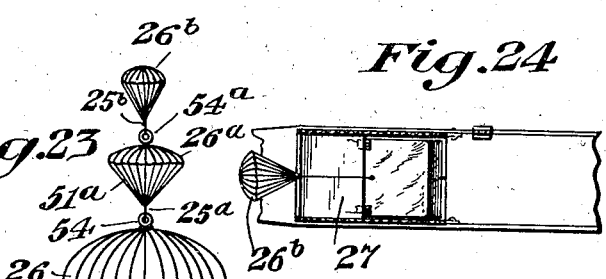
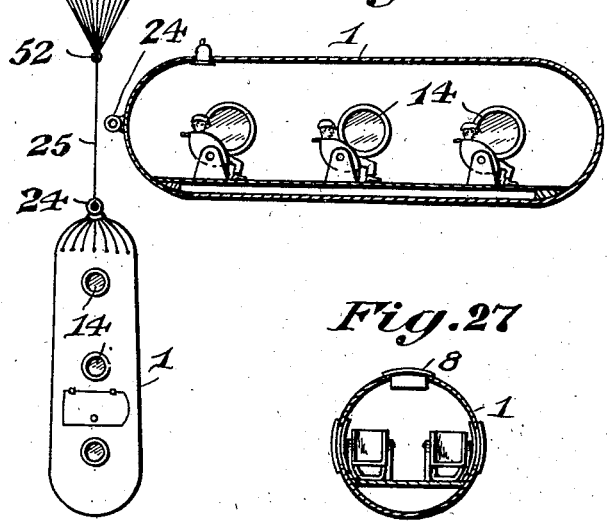

June 14, 1938.   H. L. ADAMS   2,120,477
DETACHABLE CABIN WITH PARACHUTE
Filed July 30, 1932   8 Sheets-Sheet 6
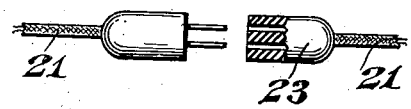
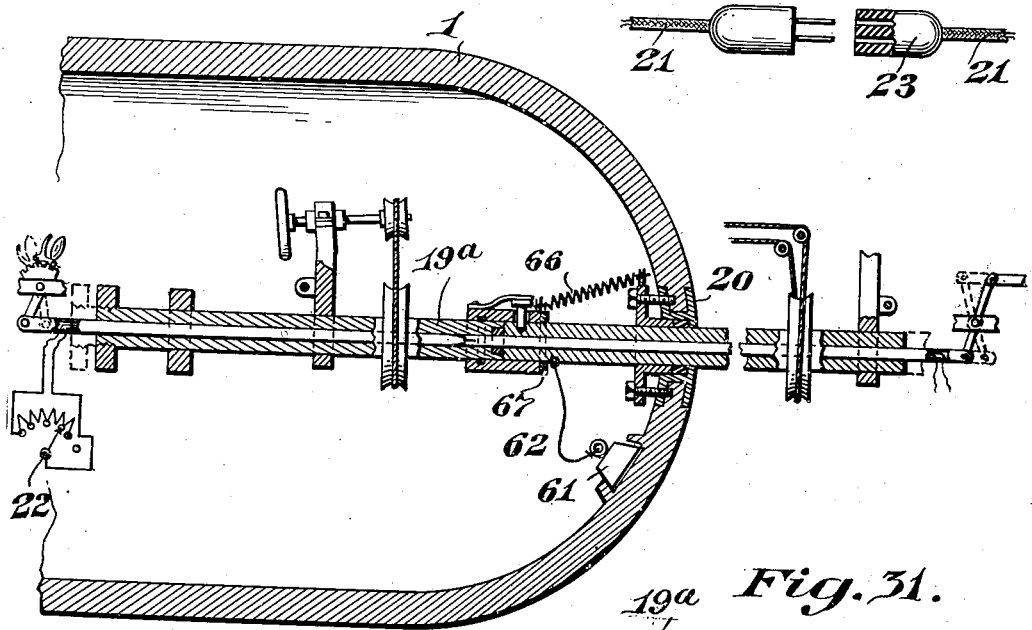
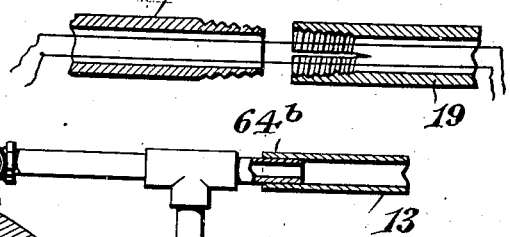
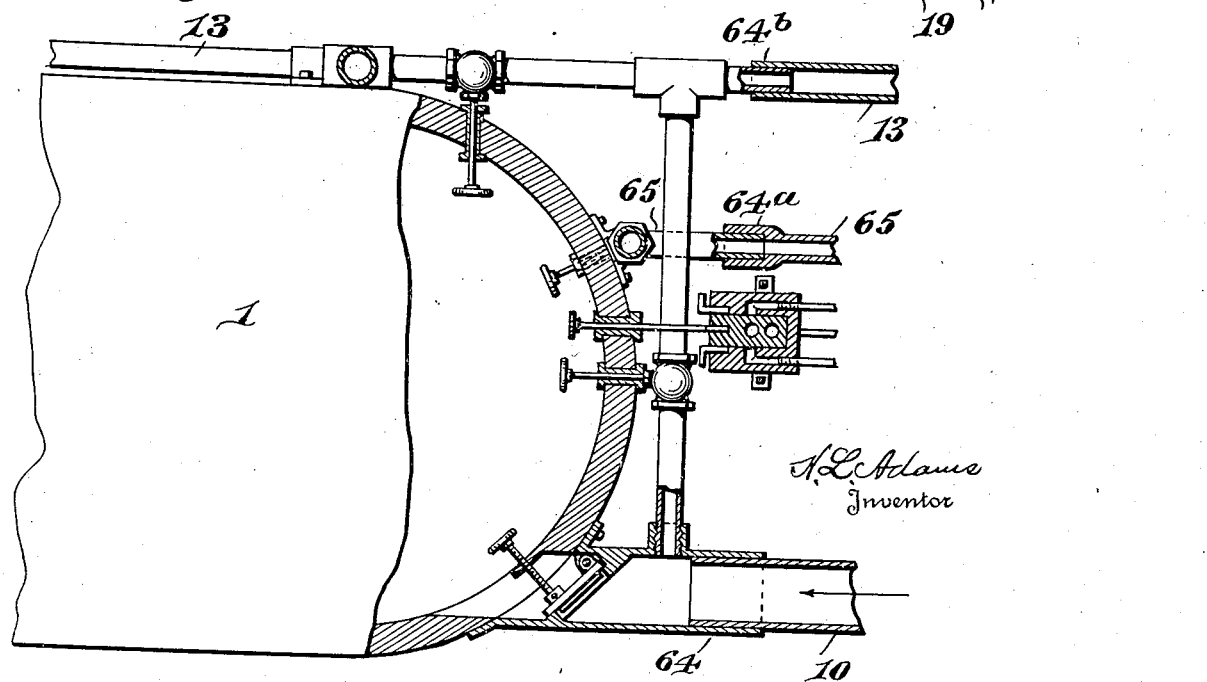

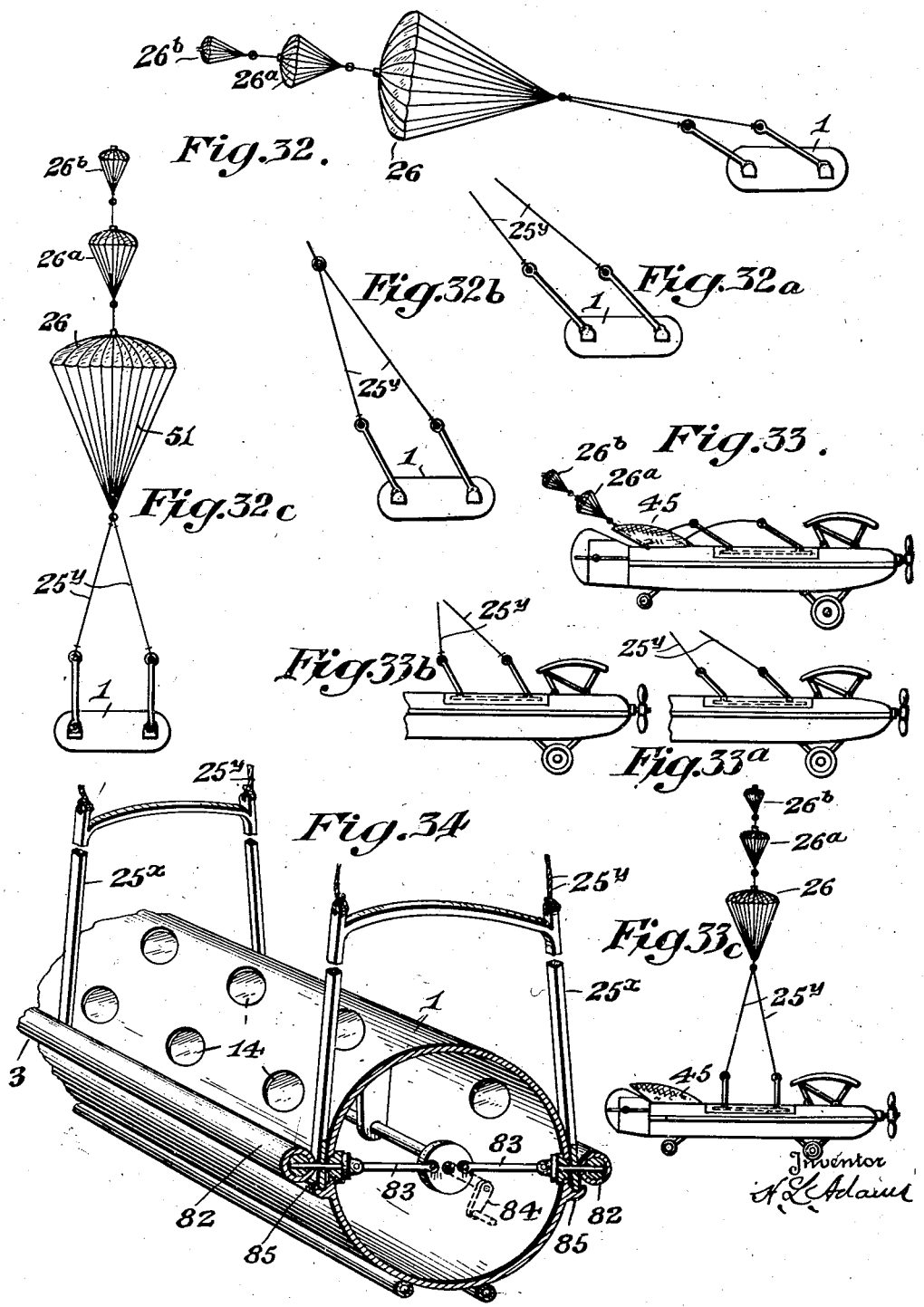

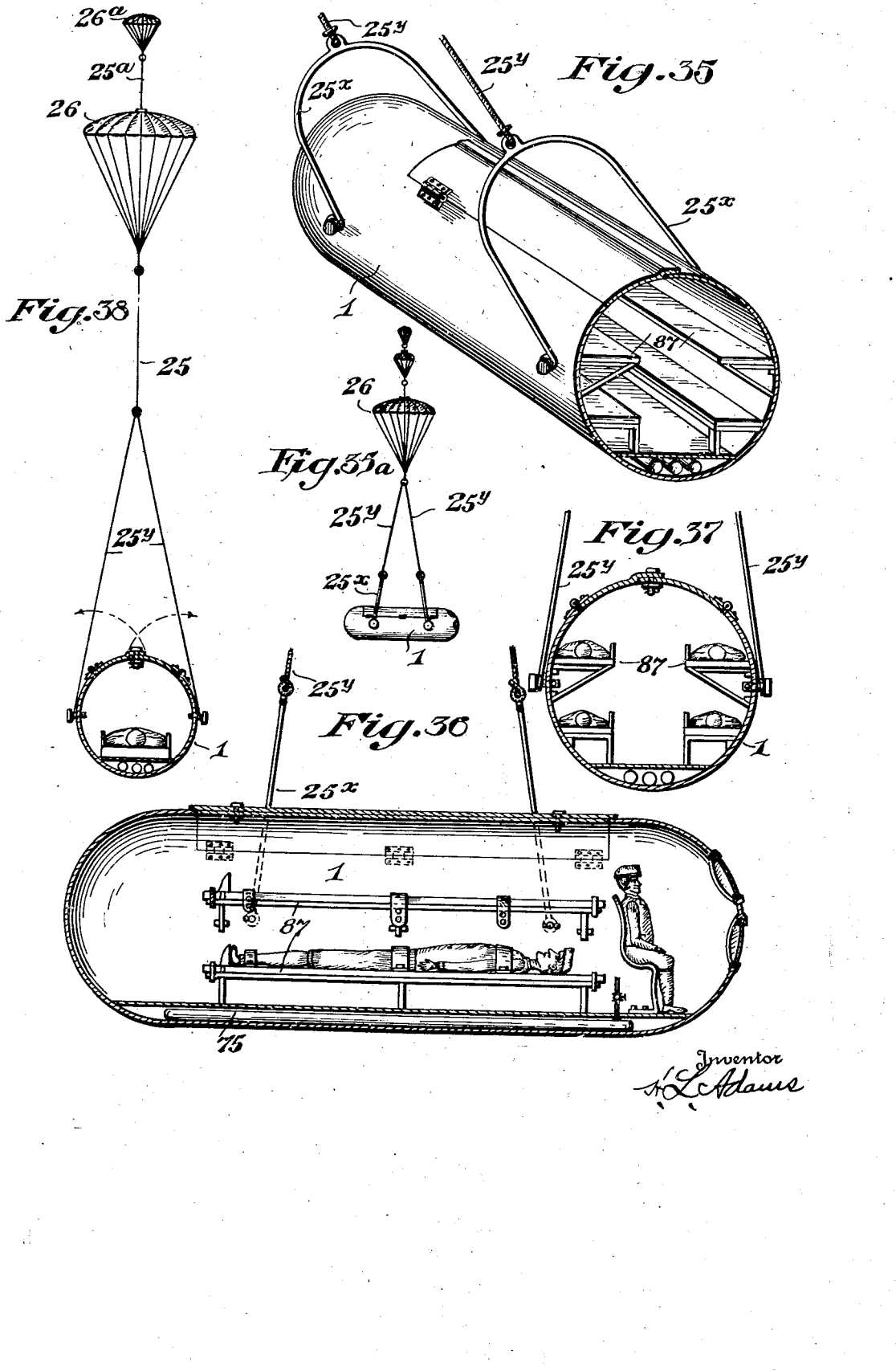

Patented June 14, 1938

2,120,477

UNITED STATES PATENT OFFICE 2,120,477

DETACHABLE CABIN WITH PARACHUTE

Herbert Luther Adams, Washington, D. C.

Application July 30, 1932, Serial No. 627,091

10 Claims. (Cl. 244—140)

This invention relates to aircraft, and more particularly to means for removing a detachable cabin from an aircraft during flight.

One of the objects of the invention is to provide means for ejecting a cabin suspending parachute from an aircraft without likelihood of fouling the parachute on some projecting portion of the aircraft.

Another object of the invention is to provide means for supporting and housing the parachute in a manner to prevent any increase in air resistance by reason thereof, and to insure the automatic discharge of the parts of the parachute in proper sequence upon the operation of manually controlled releasing means.

Another object of the invention is to provide for the release of the cabin coincidentally with the release of the parachute.

Another object of the invention is to provide for the proper arrangement of the cabin with respect to the parachute and to the adjacent surfaces of the aircraft in a manner to facilitate the removal of the cabin from the aircraft upon ejecting the parachute.

Another object of the invention is to provide means within the cabin for releasing the parachute therefrom if desired.

A cabin removing means in accordance with this invention is illustrated in the accompanying drawings, in which:

Figure 1 is a side elevation of an aircraft in flight showing the cabin partially removed.

Figure 2 is a fragmentary top plan of the aircraft showing the cover for the parachute container in open position.

Figure 3 is an enlarged sectional elevation showing the releasing means for the cabin and container cover.

Figure 4 is a transverse section through the cabin.

Figure 5 is an enlarged sectional elevation similar to Figure 1 but prior to the ejection of the main parachute.

Figure 6 is a fragmentary top plan of the container cover.

Figure 7 is an enlarged sectional elevation showing the means for opening the cover and bottom door for the container.

Figure 8 is a fragmentary top plan showing the cover in closed position.

Figure 9 is an enlarged fragmentary sectional plan showing the container and door operating means thereof.

Figure 10 is an enlarged perspective view of the container.

Figure 11 is a semi-inverted fragmentary section showing the means for securing the pilot parachute to the cover.

Figures 12, 13, 14 and 15 are enlarged fragmentary detail views showing modifications of means for connecting the shroud lines with the cabin suspending cable.

Figure 16 is a side elevation showing in dotted lines the cover in open position.

Figure 17 is a fragmentary top plan showing the skid surface over which the cabin is removed from the aircraft.

Figure 18 is a side elevation of the aircraft.

Figure 19 is an enlarged fragmentary section through the parachute container.

Figure 20 is an enlarged fragmentary elevation of the interior of the container.

Figure 21 is a front elevation of the aircraft.

Figure 22 is a part sectional view of aeroplane with cabin shown in elevation with container for parachute and reenforcing means for the hook that holds the cabin to the parachute.

Figure 23 is an elevation showing a means for supporting the cabin when released with parachute.

Figure 24 is a plan view with the container just opened and the pilot chute starting the operation of removing the parachute and the cabin.

Figure 25 is a longitudinal section of an aircraft cabin having an adjustable seat that rights itself automatically when the cabin is in a vertical position instead of the normal horizontal position.

Figure 26 is a longitudinal section of the cabin having the adjustable seats in normal position.

Figure 27 is a cross section through the cabin showing the adjustable seats with a storage place under the cabin floor.

Figure 28 is a longitudinal sectional detail of the head end of the cabin showing the means for releasing the control means of the aircraft.

Figure 29 is a detail drawing of a two wired cable switch or plug switch that breaks automatically from aircraft when the cabin is released.

Figure 30 is a broken section of head of cabin, the various external pipes may be controlled inside the cabin for intake exhaust from cabin to engine and exhaust from engine to cabin for heating cabin.

Figure 31 is a longitudinal detail of a hollow rod inside hollow shaft that operates the aircraft.

Figures 32 to 32c, are a series of four elevational views, showing the method of the operation of the harness for holding the cabin to the parachute.

Figures 33 to 33c are a series of four elevational views, a, b, c, d, showing the method of securing the parachute to the aircraft as well as the cabin.

Figure 34 is a perspective sectional view of the cabin and attachment to the framing with harness attached to parachute.

Figures 35 and 35a are perspective views of a cylindrical cabin ambulance attached to a parachute for safety.

Figure 36 is a longitudinal section of the cabin showing the pilot and the people placed on the stretchers upon the shelves.

Figure 37 is a cross section of the cabin showing the shelves and the people placed upon the stretchers with a protector to keep them from rolling out and ballast in the bottom to keep the cabin right side up on the water.

Figure 38 is a modification of Figure 37 for one patient.

Referring to the drawings in detail, the numeral 3 designates an aircraft provided with a cabin 1 which preferably is cylindrical in form with rounded or hemispherical ends as indicated at 2.

A connection to this cabin may be made preferably in the form of a ring, ring bolt or eye bolt 24 securely attached to the rear end of cylinder with reinforcing means extending from the ring 24 to the rest of the cabin to prevent it tearing out. The ends of these reinforcing means may have wires or thin bands extending around the other end of the cabin to give greater security and strength in the protection from tearing. To the ring, rings or eye bolt 24 may be attached by line 25 secured through ring 24 the other end of said line is attached to shroud lines of a parachute 26, 26a, 26b with means for releasing and hauling the cabin 1 from the aircraft if the same becomes necessary. The parachute 26 should preferably be stored at the rear of the aeroplane cabin and should have a pilot chute 26b for hauling the same out of its container. Two or more pilot chutes may be used in this operation a small one 26b hauling out a somewhat larger one 26a which in turn hauls out the main parachute 26.

The preferred arrangement will be to have a stream lined cover 27 for the parachute container 28 with hinges 29 at the rear edge of the container 28. The cover 27 extends forward to the rear edge of cylindrical part of cabin 1 and fitting around the curve of the cabin to perfectly stream line the cabin and fits within a groove on its horizontal edge or similar device to prevent its spreading outward. An eye bolt 30 in upper edge of the cover 27 passes through an opening into the cabin 1 with an opening inside the cabin through which a pin 31 passes to secure the eye bolt 30 and the cover 27 and to prevent the operation of parachute until the same is desired. The pin 31 has a connection 32 inside a pipe 33 that extends to within reach of the operator terminating in a ring or lever 34. An extension 32a of this means for operating the pin 31 terminates in a second control 34a near the operator when in the outside cockpit. This may be arranged detachable or the aviator may detach the outside control when entering the cabin and seal up the opening, or plunger washers similar to that used in an air pump may be used attached to the rod inside the pipes to prevent the escape of air from the cabin outside. The eye bolts 30 should have a tight fitting rubber washer between the pin 31 and cabin or inclosed part as shown attached to pipe 33 enclosing pin 31 in airtight pocket to prevent the escape of air through the opening as a tight fitting pin 31 at this place might not be desirable. An automatic opening device for cover 27 on either or both sides of the fuselage to force the cover upwards sufficient to allow the air to throw it backwards may be provided in the form of a rod 35 extending down from the edge of the cover 27 to a collar 36 on the rod 35 below which is a circular spring 37 under compression that rests upon a bearing 38 through which the rod 35 moves the other end of which has a link 39 swinging in a bearing 40 on the other end of which is a connection 41 to door 42 that covers porous bottom 43 to the container 28. This is to furnish a forced draft under the parachute due to the onrushing air caused by the movement of the aeroplane being forced up under the parachute to aid in releasing it from container. This door 42 may have triangular cloth sides 44 to form a more complete funnel for forcing the air upward. The cover 27 at the top of the container 28 likewise may have pieces of triangular cloth 45 attached to the edge of the cover on one side and the other side of which is attached to the opening edge of the fuselage so that when the cover 27 is open a more complete shield at sides for the parachute 26 and the cabin 1 is obtained as they leave aircraft 3.

The shroud lines 51 of main parachute 26 should be secured in pockets 63 over hook 53 or in loops or similar device for holding loop bundles of the shroud lines 51 on this sloping back wall of container 28. These loop bundles may be in corrugations, grooves or have partitions of canvas 35 between them. Line or lines 25 from these shroud lines should pass over the top of container 28 and be attached to the load or ring or rings 24, or other means of securing the cabin 1 to aircraft 3. Adjustable means may be provided for making container 28 of the size to secure the parachute 26 and prevent it getting out of place.

The force of the door 27 opening shall be used to operate restraining devices to pilot chutes 26b. This force will be quite severe when forced back by the on rushing air and a wire rope 58 should be in the upper end of the canvas 45 connecting the outer edge of the door 27 farthest from the hinge 29 with outer edge of the opening farthest from the hinge 29 should have a wire rope 58 attached at these two points on each side of opening to take the strain caused by the door 27 flying back. Spring action preferably secured to wire rope 58 may be used if the same is found necessary or desirable to prevent undue strain upon the aircraft 3 or hinge 29 but may have a stop to prevent undue stretching of spring or undue oscillating of door 27.

The outer edge of this cloth shield 45 may have a wire rope or line 58 to which may be attached a resilient or retarding means 46 to absorb the shock of the cover 27 when that would take place when it is completely opened to prevent damage to the hinges 29 to the cover 27. In the forward edge of the stream lined cover 27 on the under side is attached a container 47 for the small pilot parachute 26b. This container 47 is attached to the forward edge securely and at the rear edge by a pin 48 and a grommet 49. The grommet 49 has a spring that causes it to withdraw leaving the inner edge of cover 27 smooth when the pin 48 securing the pilot chute 26b is removed. A line 50 is attached to the pin 48 and secured to the fuselage with sufficient length to cause the small pilot chute 26b to be released and to remove the pin 48 from the grommets 49 at the desired time before the stream lined cover 27 is completely open causing the releasing of the pilot chute 26b to be automatic making all the other operations of the parachute automatic. The line 25 attached to the ring 24 of the cabin shall extend back over the top of the container 28 and terminate in an arrangement for securing the shroud lines 51 of the parachute which has a ring 52. The shroud lines 51 are secured over hooks 53 in loop bundles and passed to the lower edge of the parachute upon the perforated bottom of the container. The upper part of parachute 26 terminates in a connection 54 having a line 25a attached to a connection 52a which is attached to shroud lines 51a of large pilot chute 26a to the top of which is secured a connection 54a to line 25b attached to a connection 52b to shroud lines 51b attached to a small pilot chute 26b.

The parachute container 28 should preferably be made of canvas secured to the diagonal back wall 60 so that when the parachute 26 is out the container 28 collapses against this wall to prevent interfering with the load the parachute is to carry.

The eye bolt 30 to the stream lined cover 27 shall have a wire 59 passing around it connected to a spring 55 for swinging the eye bolt through about 180 degrees preferably to remove it from any position where it would endanger the parachutes leaving the aircraft. The spring 55 is disposed within a socket formed in the forward edge of the cover 27, and said forward edge is provided with a slot to receive the eye bolt when the latter is swinging about its pivot.

The parachute 26 may be released from the inside of cabin 1 and allow the parachute 26 to collapse and prevent the cabin 1 from being drawn along the ground on landing. This may be accomplished by a curved wedge 56 or wedges securing the pin or pins 57 holding the ring 24 or rings outside the cabin. The cabin may be hauled out to the rear but when free of the aeroplane may be suspended in normal position if desired. The main thing is to have it get out the rear through door 27 protector to prevent unnecessary damage to cabin 1 or parachute 26 or delay in leaving aeroplane 3.

Figure 27 shows a storage space under the cabin floor in which may be kept ballast or provisions, fresh water and emergency rations, emergency oxygen tanks, wireless apparatus, mast for making the container a sail boat, also signalling devices, etc., any supplies found desirable.

The method of securing the parachute to the aircraft as well as to the cabin shown in Figure 33 the center of gravity of the aircraft must fall between these two harnesses or bails and by this method it enables the operator to try to save the aircraft until it is near enough to the ground so that the operator may drop it where it will do the least damage to people or property below.

The attachment to the framing with harness attached to the parachute shown in Figure 34 furnishes a method for releasing the aircraft which is only shown in the front in section but is similar to construction in the rear harness. The cabin may be later released on reaching the ground by separate operation. The center of gravity of the aeroplane and cabin must be between the forward and rear harness to give stability when supported by parachute.

The cylindrical cabin ambulance attached to a parachute for safety is shown in Fig. 35 whereby all the occupants may in case of fire be safely landed on land or water. Shelves are provided inside the cabin on which stretchers are to be secured and a door is provided at the top for removing same.

In this case, it is arranged for four people but any number that it is found convenient may be used.

A longitudinal sectional detail shown in Figure 28 of the head end of the cabin shows the means for releasing the control means of the aircraft inside the cabin from its extension on the outside which controls the aircraft. The connections necessary for the operation of control means may be attached to a hollow shaft or extend through it to the outside.

A detail drawing shown in Figure 29 is of a two wired cable switch or plug switch that breaks automatically from aircraft when the cabin is released. This two wired plug switch may be multiple in any number found desirable for lighting, ignition control, radio or any other electrical connection found desirable or necessary or separate electrical connections may be provided in much the same manner in other parts of the aircraft.

A broken section shown in Figure 30 is a head of cabin, the various external pipes may be controlled inside the cabin for intake exhaust from cabin to engine and exhaust from engine to cabin for heating cabin.

A longitudinal detail shown in Figure 31 is of a hollow rod inside hollow shaft that operates the direction of aircraft for operating the throttle to the engine. This is split and threaded so that when it is within the hollow shaft it is held securely but once released from the hollow shaft the threads are easily stripped one over the other.

An upwardly and rearwardly inclined skid or skid surface 68 is formed in the rear of the aeroplane to direct the removal of the aeroplane cabin 1 from the framing when the parachute 26 is in operation. The cover 27 swings back and acts as an extended skid surface for parachute 26 and cabin 1. The skid surface 68 is curved in cross section corresponding to the contour of the cabin to guide the latter as it is drawn from the aircraft.

The cabin 1 may have clamps 69 that can be drawn in sufficiently to free the cabin 1 from the framing 70 when release for parachute and stream lined cover 27 for end of cabin has been released. All of these releasing devices may be attached to one lever 34. When the parachute cover 27 is released, the pilot parachute 26b is released automatically, due to the releasing of the cover 27 so that the rest is automatic by the pilot parachute 26b pulling on line 25b drawing out intermediate chute 26a to draw out the main parachute 26 having an attaching means as line 25 to cabin 1 or in place of line 25 lines 25Y may be attached to saddle connecting straps 25X which are connected detachably to cabin 1.

Instead of securing the cabin 1 on the end a double inverted Y branch or bail connection 25Y may be made on each side of the cabin 1 at each end making four connections in all which have lines 25Y extending to a connection 25 to the parachute 26. This arrangement is to keep the cabin on an even keel. This arrangement may also be utilized for holding the whole aircraft 3 which may be released without releasing the cabin 1 and the cabin 1 may later be released from parachute 26 on landing.

The pin 82 extending into the inside of the cabin 1 having connections 83 under the control 84 of the operator that may be drawn in sufficient amount to release the aircraft 3 if the aircraft has arrived at a position where the pilot can ascertain that no person on the ground below will be injured if the aircraft 3 is released then the parachute 26 can be landed with the cabin 1 attached more gently than if it were necessary to land the whole aircraft 3.

A special connection at the bottom edge of the yolk or an inverted Y branch ropes which is housed in a boss 85 on its lower edge to keep it from pulling off the pin 82 until the pin 82 is entirely removed so that the cabin 1 is secured to the parachute 26 if the aircraft 3 has been released. By further operating the pins 82 which are still under control 84 of the operator the parachute 26 may be entirely released from the cabin 1 if so desired to prevent dragging the cabin 1 over the ground. The parachute 26 without its load should soon collapse and prevent tearing parachute 26 unnecessarily.

A spring hinge in parachute door makes the door spring back quickly when catch is released taking the small pilot chute with it. The small pilot chute opens automatically when the door is wide open being held in place until such time that it may not become fouled. The larger pilot chute is drawn out by the smaller one.

The larger pilot chute is attached to the top of the main parachute and hauls it out of its container over the door to container. On each side of the door and each side of the container there is triangular strip of canvas, cloth or netting protector for the parachute when the door is open to prevent the parachute getting caught upon anything that might tear it. The rear edge of the container from the bottom upward slopes in a backward direction making it easier for the parachute to be hauled back. The releasing of the door upon the top may automatically release a funnel shaped opening underneath the container that will aid in forcing the parachute out of the container by pneumatic action of inrushing air.

I have shown an apparatus embodying my invention in several general forms but do not wish to be understood as limiting myself strictly to the precise details of construction hereinbefore described. I do not wish to be held to exact shapes or dimensions or to any particular combination of parts but wish to be free to use any part herein shown or described or covered by the claims with any other part or parts whether shown herein or elsewhere.

Having thus described my invention, what I claim as new, and desire to secure by Letters Patent, is:—

1. In an aircraft, a detachable cabin, said cabin being air tight, a cover hinged at the rear edge to the aircraft at the rear of said cabin and releasably secured at its front edge to said cabin, means for opening said cover, said cover when open extending upward and rearwardly to form a gouged shape skidway for said cabin, means operable to detach the cabin from the aircraft and a device to remove said cabin from said aircraft in rearward sliding movement substantially lengthwise of said cabin and said fuselage.

2. In an aircraft, a detachable cabin, said cabin being air tight, an upwardly curved cover hinged to the aircraft at the rear of said cabin, detachably secured at its front edge to said cabin, said cover when released forming on its inner face an upwardly and rearwardly extending trough to guide said cabin and a device that moves said cabin from said aircraft by a sliding movement between the bottom of the cabin and normal horizontal inner surface of said fuselage and inner face of said cover.

3. In an aircraft, a substantially horizontal gouged shape skidway in said aircraft, a detachable cabin secured in said skidway, said cabin being air tight, a streamlining cover hingedly connected to said aircraft at the rear of said cabin, means for opening said cover, said cover when opened forming an upwardly and rearwardly extending extension to said gouged shaped skidway, said open cover giving added gliding stability to said aircraft, resilient means to facilitate opening the streamlined rear cover, a device in connection with said cabin for releasing said cabin, a device attached to said cabin for removing said cabin and means connected to said releasing means and to said cover for simultaneously releasing said cabin and said removing device.

4. In an aircraft, a detachable cabin, said cabin being air tight, said cabin being cylindrical in shape, hemispherical ends on said cabin, interconnecting releasing mechanism operable from either inside or outside of said cabin to disconnect said cabin from said aircraft.

5. In an aircraft, a detachable airtight cabin, said cabin being cylindrical in shape, hemispherical ends on said cabin, interconnecting releasing mechanism operable from either inside or outside of said cabin to disconnect said cabin from said aircraft, and a hinged streamlined portion at the rear of said cabin, said portion being releasably secured at its forward end to said cabin, said portion when released forming on its inner surface an extension skidway for said cabin, and means for securing said portion to said cabin and said aircraft.

6. In an aircraft, a detachable air tight cabin comprising double concentric, spaced cylindrical walls with a corrugated metal wall therebetween, and hemispherical outwardly curved ends, interconnecting releasing mechanism on said cabin for detachably securing said cabin to said aircraft and operable from either inside or outside of said cabin, releasable bails on said cabin, said bails having attachment to a parachute, means for releasing said bails and said parachute from said cabin.

7. In an aircraft, a substantially horizontal gouged shaped skidway in said aircraft, a detachable cabin secured in said skidway, said cabin being air tight, a streamlining cover hingedly connected to said aircraft at the rear of said cabin, means for opening said cover, said cover when opened forming an upwardly and rearwardly extending extension to said gouged shaped skidway, said open cover giving added gliding stability to said aircraft, resilient means to facilitate opening the streamlined rear cover, a device in connection with said cabin for releasing said cabin, a device attached to said cabin for removing said cabin.

8. In an aircraft, a detachable cabin, said cabin secured detachably to said aircraft by interconnecting releasing mechanism on said cabin for detachably securing said cabin to said aircraft and releasable operating mechanism in said cabin for operating said aircraft and means operable from either inside or outside of said cabin for releasing said cabin from said aircraft.

9. In an aircraft, a detachable cabin, interconnecting releasing mechanism on said cabin for detachably securing said cabin to said aircraft and operable from either inside or outside of said cabin, a parachute releasably attached to said cabin, suitable reenforcing means on said cabin at place where said parachute is attached to said cabin.

10. In an aircraft, a detachable cabin, interconnecting releasing mechanism on said cabin for detachably securing said cabin to said aircraft and operable from either inside or outside of said cabin, releasable bails on said cabin, said bails having attachment to a parachute, means for releasing said bails and said parachute from said cabin.

HERBERT L. ADAMS.